United States Patent [19]
Davis, Jr. et al.

[11] Patent Number: 6,092,916
[45] Date of Patent: Jul. 25, 2000

[54] MODULAR HEADLINER WITH SELF-ALIGNING LAMP

[75] Inventors: Joseph J. Davis, Jr., Ortonville; Gary J. Sadek, Plymouth, both of Mich.

[73] Assignee: Lear Automotive Dearborn, Inc., Southfield, Mich.

[21] Appl. No.: 09/167,832

[22] Filed: Oct. 7, 1998

[51] Int. Cl.[7] .................................................. B60Q 1/00
[52] U.S. Cl. ........................ 362/490; 362/488; 362/493
[58] Field of Search ................................... 362/490, 488, 362/487, 493

[56] References Cited

U.S. PATENT DOCUMENTS

| | | | |
|---|---|---|---|
| 4,893,867 | 1/1990 | Hilborn et al. | 296/214 |
| 5,039,853 | 8/1991 | Blake et al. | |
| 5,649,436 | 7/1997 | Davidge | 70/18 |
| 5,944,414 | 9/1999 | Nishitani | 362/490 |

FOREIGN PATENT DOCUMENTS

| | | |
|---|---|---|
| 0 473 263 | 3/1992 | European Pat. Off. . |
| 0 717 196 | 6/1996 | European Pat. Off. . |
| 22 48 926 | 4/1974 | Germany . |
| 44 26 404 | 2/1996 | Germany . |

*Primary Examiner*—Cassandra Spyrou
*Assistant Examiner*—Fayez Assaf
*Attorney, Agent, or Firm*—MacMillan, Sobanski & Todd, LLC

[57] ABSTRACT

A modular headliner includes a central lamp component with an upper and lower lamp components. The upper and lower lamp components snap together on each side of the headliner. This allows the lamp to be mounted into the vehicle with the lamp already assembled. The upper lamp component is provided with a pair of spaced adhesive tape strips. The adhesive tape strips wet out on a support surface in the vehicle ceiling, securing the upper component to the vehicle ceiling. In this way, there is no complex alignment necessary between the components of the lamp and structure on the vehicle ceiling. Instead, the upper component of the lamp merely attaches itself to the ceiling wherever it may be in the individual vehicle, utilizing the individual headliner. Further, the lower component is attached to the upper component through a yieldable connection. In this way, the lower component can be removed from the upper component after the headliner has been assembled into the vehicle.

10 Claims, 2 Drawing Sheets

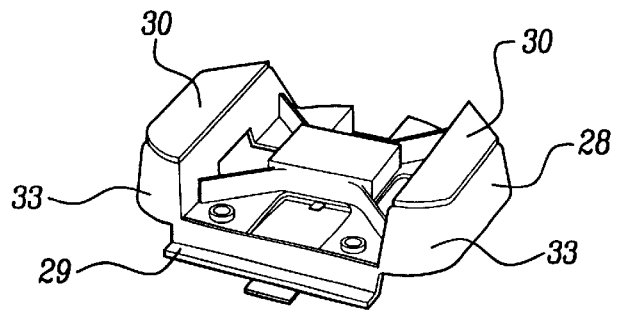
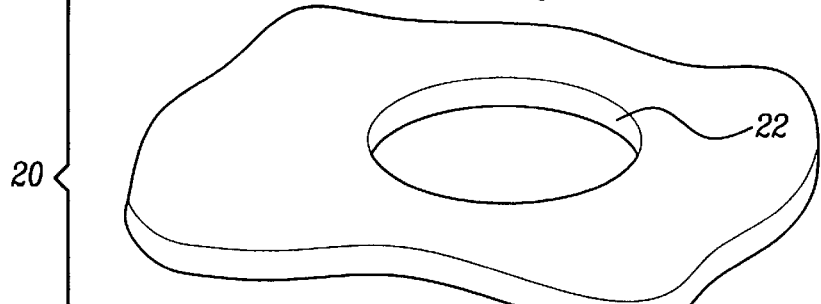
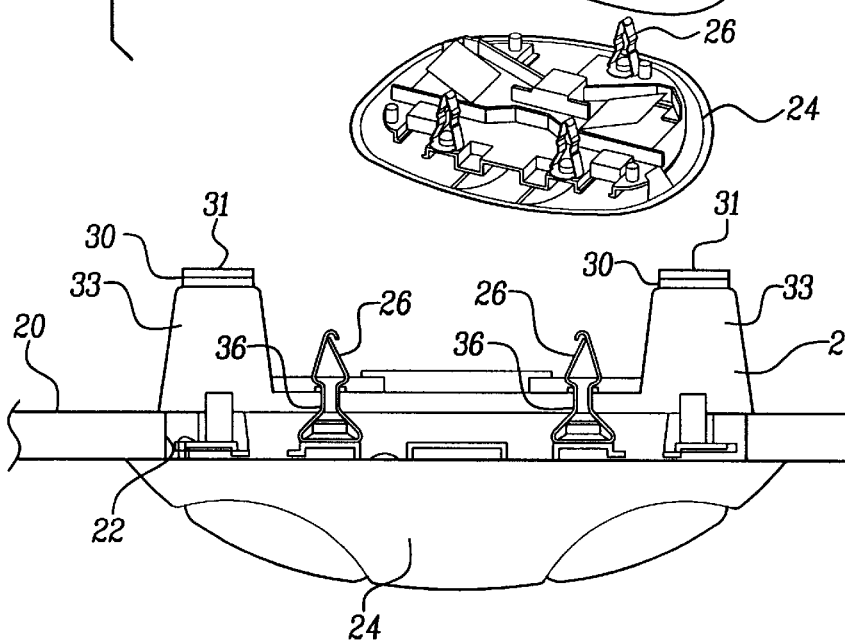
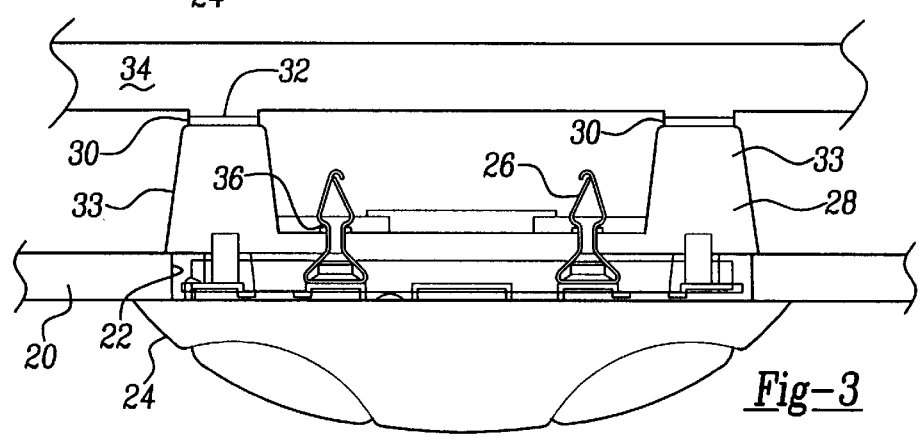

6,092,916

MODULAR HEADLINER WITH SELF-ALIGNING LAMP

BACKGROUND OF THE INVENTION

This invention relates to a method of attaching a modular headliner including a ceiling lamp assembly, wherein the ceiling lamp assembly is self-aligning with an attachment surface on the vehicle roof.

Headliners are utilized in vehicles to cover the ceiling. Headliners provide a pleasing aesthetic appearance, and also provides several functional benefits. Recently, there has been an overall push in the automotive industry to have modular components assembled by the auto suppliers. One major modular assembly has been the vehicle headliner. Vehicle headliners are now typically supplied with the bulk of their components preassembled such that the vehicle manufacturer need only insert the entire assembled headliner into the vehicle.

One problem with such modular headliners has been with components which must be attached to the vehicle frame. One particular challenging component has been the ceiling lamp. The ceiling lamp has typically been attached to the vehicle ceiling frame by a component which is initially attached to the frame. That component is then attached to the ceiling lamp assembly.

Typically, a lower lamp component is inserted into an underside of the headliner. An upper mating component of the lamp is attached to the vehicle frame. The two halves of the lamp are then connected together when the headliner is inserted into the vehicle. There are difficulties with this arrangement. One main difficulty has been in aligning the two lamp components as the headliner is moved into the vehicle. The portions which are attached to the vehicle frame have typically been attached to the roof beams. There are manufacturing tolerances with regard to these beams, and the location of the beam is not entirely predictable. Thus, the location of the mating component is also not predictable. Assemblers have sometimes had difficulty in matching the location of the lamp component above the headliner with the portion below.

Recently, one type of lamp assembly utilized hook and loop type fasteners (Velcro™) to attach the upper lamp component to the vehicle ceiling frame. The headliner is then attached to the vehicle with the lower lamp portion attached to its mating upper surface. This arrangement does not entirely solve the problem in that the location of the hook and loop fastener is not entirely predictable. Also, the vehicle assembler must attach one side of the hook and loop fastener to the ceiling frame. Further, the hook and loop fastener typically has a relatively low attachment strength.

After assembly of the lamp and headliner into the vehicle, it may sometimes be desirable to remove the lower lamp portion for replacement of the bulb, etc. The prior art hook and loop fastener has not included sufficient holding strength such that the lower portion of the lamp is removable from the upper portion. Often the upper portion itself separates from the ceiling when an attempt has been made to remove the lower portion.

SUMMARY OF THE INVENTION

In a disclosed embodiment of this invention, a modular headliner is provided with a lamp assembly including a lower component and an upper component which snap together on each side of the headliner. Tape is placed upon the upper surface of the upper component. The tape is sufficiently strong such that it can hold the upper component to the vehicle ceiling. Now, when the headliner is inserted into the vehicle, the tape wets onto a vehicle frame surface, securing the upper portion. There is no need to align any particular location on the vehicle frame with the headliner, as the tape will attach itself to the frame at the location it finds itself in the individual vehicle.

Thus, the present invention allows the complete modular attachment of the lamp assembly to the headliner. The two components are assembled on each side of the headliner by the headliner supplier. The vehicle manufacturer removes a protective covering from the adhesive tape, and then mount the headliner in the vehicle. The adhesive tape wets itself to the vehicle frame, securing the upper component of the lamp.

At the same time, the tape provides a sufficient hold strength such that the lower portion of the lamp may be removed from the upper portion, without the upper portion separating from the vehicle ceiling. To this end, snap tabs, or yieldable tangs, are included between the upper and lower portions to removably attach the upper and lower portions of the lamp assembly together. The yield strength of the tabs is less then the peel strength of the tape. Now, when one wishes to remove the lower lamp assembly, one merely pulls on the lower lamp assembly. The tangs yield and the lower portion is thus removable from the upper portion.

These and other features of the present invention can be best understood from the following specification and drawings, the following of which is a brief description.

BRIEF DESCRIPTION OF THE DRAWINGS

FIG. 1 is schematic view of a headliner incorporating the present invention.

FIG. 2 is a cross-sectional view through a headliner mounting the inventive lamp.

FIG. 3 is a view showing the headliner and its lamp mounted within a vehicle.

DETAILED DESCRIPTION OF A PREFERRED EMBODIMENT

Figure 4:
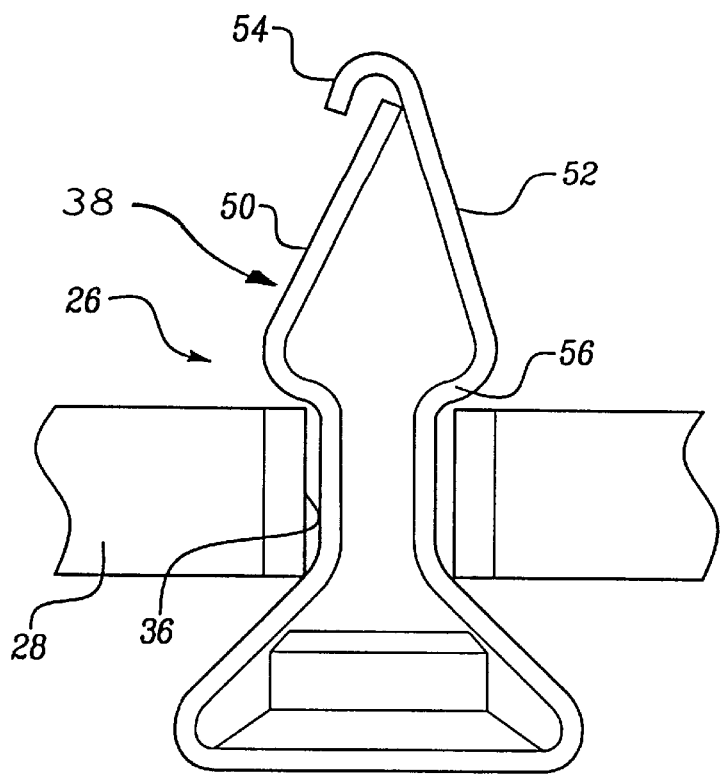
FIG. 4 shows a separating feature of the present invention.

FIG. 1 shows an inventive modular headliner 20 having a central aperture 22. A lower lamp component 24 has yieldable tangs 26 to snap to an upper lamp component 28. The upper lamp component 28 includes ledge surfaces 29 to sit on an upper surface of the headliner 20. The upper component 28 also includes tape strips 30 for securing the upper component 28 to a vehicle frame.

FIG. 2 shows the assembled headliner 20. As shown, the upper component 28 receives the lower component 24 with the tangs 26 snapping into openings 36 to secure the two together. As also shown, the tape 30 includes a protective covering 31. The modular headliner 20 is shipped with the lamp assembled in this fashion. Once at the vehicle manufacturer, the protective covering 31 is removed and the headliner may then be inserted into the vehicle. As can be appreciated from FIGS. 1–3, the tape 30 is mounted atop columns 33, which extends upwardly from a main body of component 28.

As shown in FIG. 3, the headliner 20 has now been inserted into a vehicle, and attached to a vehicle ceiling frame ridges 32. As shown, the tape strips 30 have wet out and attached to the frame ridges 32. Ridges 32 are fixed to the ceiling frame 34. In the prior art, the location of the ridges 32 was sometimes subject to slight manufacturing tolerances. Those manufacturing tolerances have led to alignment problems with the prior art lamp assemblies. The present invention eliminates these problems by utilizing the tape strips 30. The tape strips 30 wet onto ridges 32 no matter the relative location, and thus serve to "self-align" the location of the lamp assembly within the vehicle.

FIG. 4 shows another feature of the present invention. As shown, the tangs 26 include a yieldable portion 38 which bends inwardly to allow passage of tangs 26 through openings 36 in the upper component 28. This allows the removal of the lower component 24 by simply pulling downwardly once the headliner has been assembled into the vehicle.

Tangs 26 include an inner leg 50 received in an outer leg 52 having a top clip 54. The legs 50 and 52 bend inwardly adjacent neck 56 to move through hole 36.

Figure 5:
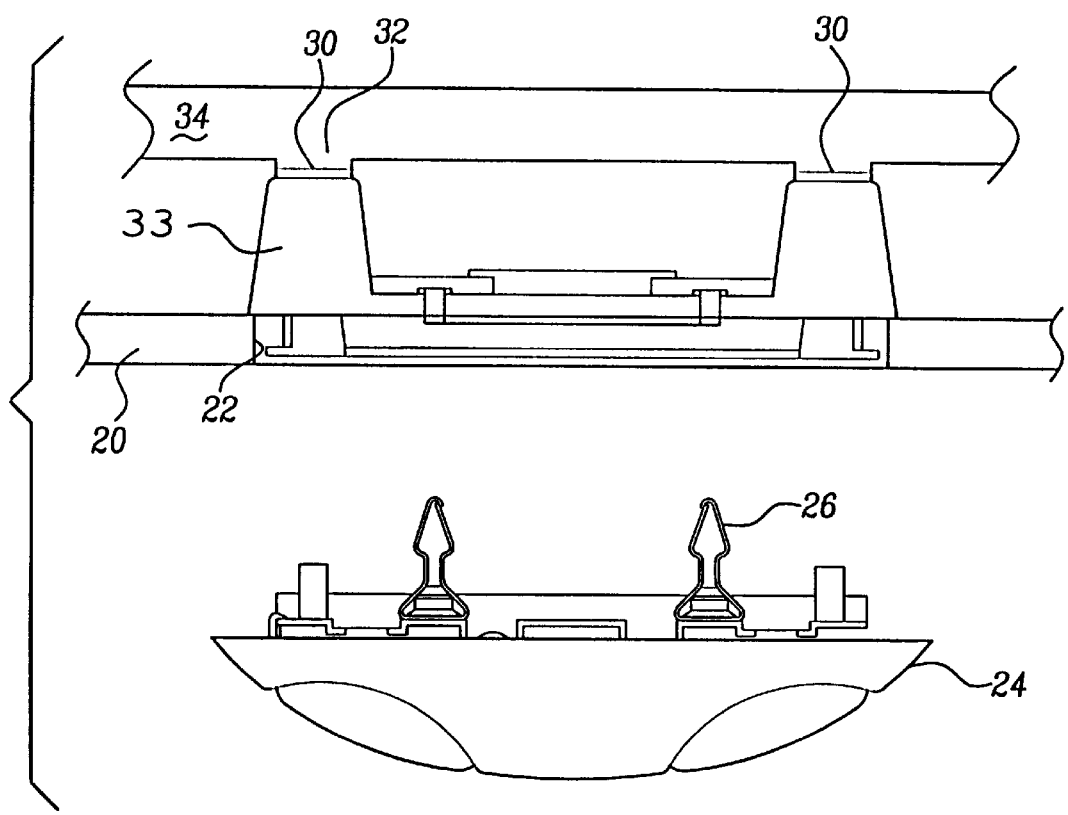
FIG. 5 shows a lamp assembly separated for maintenance or repair.

As shown in FIG. 5, due to the structure of the tangs 26, the lower component 24 may be removed from the upper component 28 to allow servicing of the lamp, etc. This is possible since the peel strength of the tape 30 is relatively high compared to the yield strength of the tangs 26.

In one embodiment, a tape available from 3M Corporation of Minneapolis, Minn., under the trade name #4225 Acrylic Foam (3M tape) Pressure Sensitive Adhesive was utilized. Preferably, the tape has a peel bond strength of over 0.7 lb. /inch.

A preferred embodiment of this invention has been disclosed; however, a worker of ordinary skill in this art would recognize that certain modifications would come within the scope of this invention. For that reason the following claims should be studied to determine the true scope and content of this invention.

What is claimed is:

1. A modular headliner comprising:

a generally planar headliner body having a central aperture; and a lamp assembly including a lower component secured to a lower face of said headliner and an upper component secured to an upper face of said headliner, said upper and lower components secured together, said upper component being provided with an adhesive surface including a plurality of spaced adhesive strips for attaching said upper component to a vehicle ceiling frame with a plurality of ridges, wherein said plurality of spaced adhesive strips, in conjunction with said plurality of ridges on said vehicle ceiling frame, provide a means of aligning said lamp assembly with respect to said vehicle ceiling frame.

2. A modular headliner as recited in claim 1, wherein one of said upper and lower components includes yieldable tangs for snapping attachment to the other of said upper and lower components such that said lower component is removable from said upper component.

3. A modular headliner as recited in claim 2, wherein the yield strength of said yieldable tangs is less than the peel strength of said adhesive surface.

4. A modular headliner as recited in claim 1, wherein said upper component has ledge surfaces which extend radially outwardly beyond said aperture in said headliner such that said upper component rests on said upper face of said headliner.

5. A vehicle ceiling assembly comprising:

an attachment surface including a plurality of ridges on a ceiling frame of a vehicle;

a headliner mounted within said vehicle and below said ceiling frame; and a lamp assembly including a lower lamp component attached to said headliner on a lower face of said headliner spaced from said ceiling frame, and an upper component of said lamp attached to said lower component and on an opposed face of said headliner from said lower component, said upper component being attached to said ceiling frame by an adhesive surface including a plurality of spaced adhesive strips, wherein said plurality of spaced adhesive strips, in conjunction with said plurality of ridges, provide a means of aligning said lamp assembly with respect to said ceiling frame.

6. An assembly as recited in claim 5, wherein one of said upper and lower component includes yieldable tangs which secure said lower component to said upper component such that said lower component is removable from said upper component.

7. An assembly as recited in claim 6, wherein the yield strength of said yieldable tangs is less than the peel strength of said adhesive surface.

8. A modular headliner assembly comprising:

an attachment surface including a plurality of ridges on a ceiling of a vehicle, a generally planar headliner body having a central aperture;

a lamp assembly including a lower lamp component secured at a lower face of said headliner and an upper lamp component secured to said lower lamp component and on an upper face of said headliner, said upper and lower lamp components being secured on each side of said central aperture, said lower lamp component being secured to said upper lamp component by one of said upper and lower lamp components including yieldable tangs having a yield strength, and said upper lamp component including an adhesive surface including a plurality of spaced adhesive strips, wherein said plurality of spaced adhesive strips, in conjunction with said plurality of ridges, provide a means of aligning said lamp assembly with respect to said ceiling.

9. A modular headliner as recited in claim 8, wherein said yieldable tangs are formed on said lower component.

10. A modular headliner assembly as recited in claim 8 wherein said adhesive surface has a peel strength which is greater than the yield strength of said yieldable tangs.

* * * * *